Aug. 18, 1964   H. O. ROSENBERG   3,144,697
SAFETY BELT BUCKLE FOR VEHICLE OCCUPANTS
Filed Dec. 29, 1960
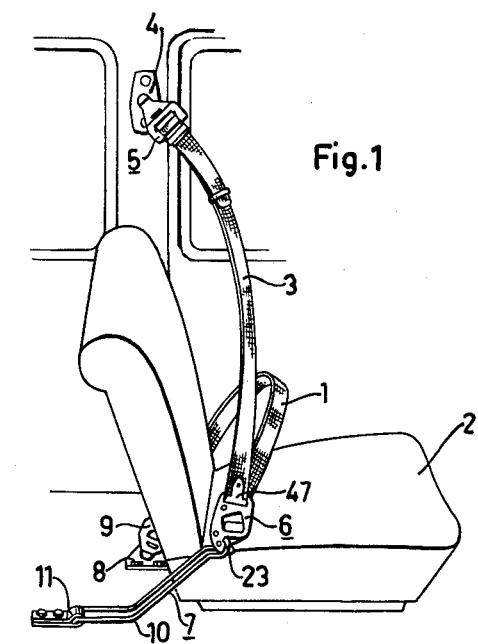
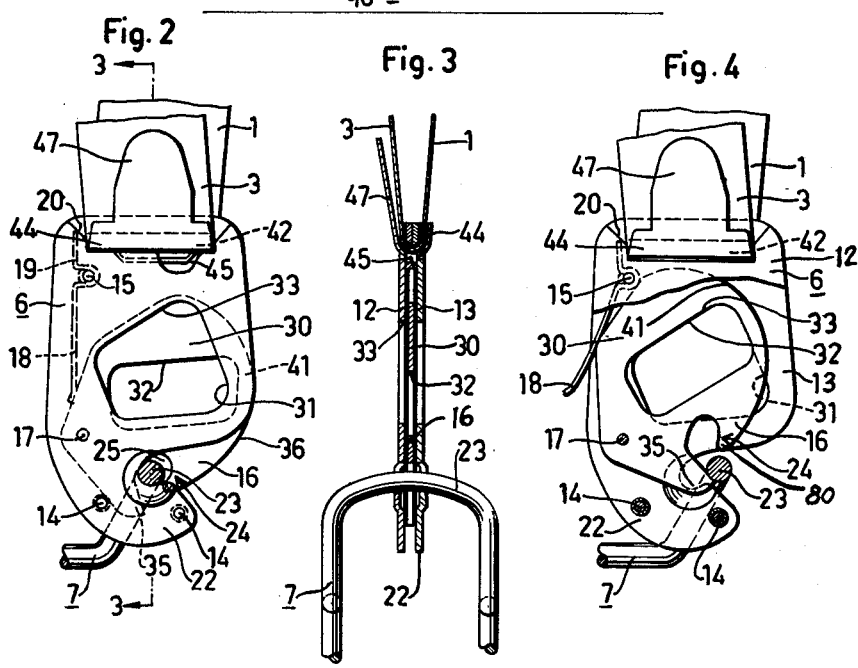

United States Patent Office 3,144,697
Patented Aug. 18, 1964

3,144,697
SAFETY BELT BUCKLE FOR VEHICLE
OCCUPANTS
Herbert Olof Rosenberg, Vikstensvagen 41,
Johanneshov, Sweden
Filed Dec. 29, 1960, Ser. No. 79,300
Claims priority, application, Sweden, Jan. 14, 1960,
326/60; Jan. 21, 1960, 548/60
2 Claims. (Cl. 24—242)

This invention relates to safety belts and more particularly to safety belts employed in association with the seats of vehicles.

The use of safety belts or safety straps in all types of passenger carrying conveyances such as automobiles, airplanes and the like, is becoming increasingly more common, particularly in connection with passenger motor vehicles. It has been found by observation and experiments that the number of fatalities resulting from motor vehicle accidents is greatly reduced in those cases where the vehicle occupant is restrained in some manner against free forward movement when the motor vehicle comes to a sudden stop and accordingly there is coming into general use belts or straps which may be passed around the body of the occupant of the motor vehicle seat and which are secured to some fixed part of the vehicle, so that in the event of a crash the occupant will not be thrown upwardly or forwardly.

In addition to the proved desirability of providing belts which will hold the occupant of the motor vehicle seat against forward or side movement in the event of a crash, it is also desirable that such belts be constructed so that they can be easily secured and, more importantly, easily released so that if it should become necessary to remove a person from a vehicle seat after an accident, the belt can be removed quickly or, if the person is not knocked unconscious, he may be able to easily and quickly open the belt himself.

In view of the foregoing, it is a particular object of the present invention to provide a new and novel belt for connecting together the belt and a hook member secured to a fixed part of the vehicle.

Another object of the invention is to provide a buckle wherein means is provided which will prevent accidental opening of the buckle.

Still another object of the invention is to provide a buckle which can be easily released from a hook member in such a manner that the hook member is forced out of engagement with the buckle.

Still another object of the invention is to provide a belt buckle of the type described and having the above designed advantages, which is of relatively simple construction whereby it may be inexpensively produced but which at the same time can be made sufficiently rugged to withstand heavy strain to which it may be subjected in use.

The invention will be best understood from a consideration of the following detail description taken in connection with the accompanying drawings wherein:

FIGURE 1 is a perspective view of the safety belt of the invention installed in a vehicle, FIGURE 2 is a front view, on an enlarged scale, illustrating the buckle of the safety belt, FIGURE 3 is a cross section taken an the line 3—3 of FIGURE 2, and FIGURE 4 shows, partly in section, in the same manner as FIGURE 2 the buckle in released condition.

Referring to the drawings, numeral 1 indicates one part of the safety belt extending from the left side of a left side vehicle seat 2 to the right side of the seat. The part 1 and the other part 3 of the belt are made all-one-piece and the part 3 extends from the right side of the seat 2 upwards to a fastening plate 4 secured to wall portion of the vehicle. The outer end of the part 3 is attached to the plate 4 by means of an adjustable buckle 5. The part 3 runs over the chest of the occupant of the seat and the part 1 engages the abdomen. The parts 1 and 3 run freely through an opening of a metal fastening means 6 on the right side of the vehicle seat where said means is attached to a link 7 secured to the floor of the vehicle. The outer end of the belt part 1 is attached to a fastening plate 8 by means of an adjustable buckle 9. Said plate 8 is located on the left side of the vehicle seat and secured to the floor of the vehicle. The adjustable buckle 9 is identical with the buckle 5 and the fastening plates 4 and 8 serve the same purpose as described below.

The link 7 is an elongated chain link which is bent in angle so that a knee 10 is formed which engages the floor whereat the outer end of the link is hinged on to a clamp 11 anchored in the floor.

The fastening means 6 consists, as shown in FIGURES 2 to 4, substantially of two plates 12 and 13 fastened together by means of rivets 14 and 15 in spaced relation. A manually-operable latch 16 is arranged between the plates 12 and 13 and pivotally mounted in a pin 17 which also may be a rivet. A leaf spring 18 maintains the latch in a closed position. The upper end portion of the leaf spring is held in fixed position by means of the rivet 15 and a compressed portion 20 of the plates 12 and 13. The fastening means 6 with the latch serves as a buckle.

At the lowermost end the buckle 6 has a hook portion 22 adapted to grasp the upper end portion 23 of the link 7, as shown in FIGURE 2. The latch 16 has a hook portion 24. When the latch takes its closed position the hook portion 24 forms together with the hook portion 22 of the buckle an opening 25 for the end portion 23 of the link 7. In this manner the hook portion 24 blocks the opening of the hook portion 22 so that the buckle 6 is coupled together with the link 7. When normal tensile forces are applied to the safety belt the hook portion 22 resists the load. In a case, however, when the applied forces tend to move the buckle to the left according to FIG. 2 the end portion 23 of the link engages the hook portion 24. In order to maintain the latch 16 in the closed position in this latter case the hook portion 24 of the latch member 16 has an outward end portion 80 of specific curvature for engaging link 7 such that relative displacement between the link and the latch member in a direction against said end portion 80 produces a force on the hook portion 24 of the latch member 16 which passes through pivot 17. Consequently no applied moment is developed which tends to turn the latch in a counter clockwise direction to the open position. To this effect the form of the edge of the opening of the hook portion 22 contributes.

In order to swing the latch 16 from the closed position a handle 30 is provided which is available through an opening 31 in the plates 12 and 13. The handle 30 is turnable in counter clock-wise direction to an end position, shown in FIG. 4, in which the upper portion of the latch engages that portion of the leaf spring 18 which grasps the rivet 15. In said position the lower edge 32 of the handle 30 is located alongside the upper edge 33 of the opening 31 and the buckle is open and the hook portion 24 of the latch uncovers the opening of the hook portion 22 so that the buckle can be disconnected from the link 7.

Opposite the hook portion 24 the latch has a finger member 35 directed downwardly. Between the right edge of the finger member and the hook portion 24 of the latch there is a gap for the insertion in the end portion 23 into the opening of the hook 24. The finger member 35 is so formed that it in the open position of the latch 16 blocks the opening of the hook portion 22. Furthermore said finger member forces the end portion 23 of the link 7 out of engagement of the hook portion 22 when the latch 16 is turned to the open position, as shown in FIG. 4. The buckle 6 thus can be easily released from the link 7 even in the event of a deformation of the buckle, e.g. due to a crash.

The outer edge 36 of the hook portion 24 of the latch, as shown in FIG. 2, is curved and runs substantially in such a direction in relation to the position of the pivot pin 17 that the buckle may be coupled together with the link 7 only by forcing the latch against the link whereat the latch momentarily is brought to the open position against the action of the leaf spring 18. Thereafter the latch is under spring action restored to the closed position in which the finger member 35 engages the left rivet 14. This rivet serves as a stop for the latch.

As will be readily apparent to persons acquainted with the construction and manner of attaching safety belts, the buckle is easily secured to and easily released from the link 7 by the user of the belt by feel alone and without the user having to see how the parts must be brought together owing to the fact that the link 7 assumes a fixed posiion and that the end portion 23 of the link is easily accessible.

The handle 30 of the latch and the hook portion 24 are connected with each other by means of an arcuate portion 41 and the handle, the hook portion 24 and the finger member 35 are made of a one piece metal plate. It is of great importance that the handle 30 is located between the plates 12 and 13 of the buckle in a shielded position so that the handle can not be actuated without intention.

At the upper end of the plates 12 and 13 there is provided a slot shaped opening 42 which openings correspond to each other. The safety belt 1, 3 is inserted through said openings and runs freely therethrough in order to divide the load of the belt parts 1 and 3 equally. In said openings 42 a curved plate 44 is inserted which grasps the curved portion of the belt between the parts 1 and 3. The bottom part of said plate 44 is formed as for example by stamping with a bow shaped part 45 which is inserted between the plates 12 and 13 and serves as a positioning member for the plate 44 so that this plate is maintained in position. One end portion of the plate 44 is elongated and forms a tongue 47 directed upwards along the part 3 of the belt. By means of this tongue the buckle 6 may be connected with the adjustable buckle 5 which is coupled together with the fastening plate 4 on the wall of the vehicle. For this purpose the buckle 5 is formed with a slot shaped opening adapted to receive the tongue 47 whereat the buckle 6 is placed upside down with the hook portions 22 ad 24 directed upwards. The buckle 6 is in this manner in readiness.

As shown in FIG. 1 the link 7 is pivotally supported in the clamp 11 so that the link is turnable upwards from the position shown in which the knee 10 rests against the floor. Due to the fact that the link has shanks which are resilient and bent at least at two points the link can be straightened which in a first moment of the crash contributes to a softer retardation.

In the case the vehicle is provided with two seats side by side the buckle 6 for each seat can be coupled together with one and the same link 7.

I claim:

1. A buckle for a safety belt for connecting the belt to a fixed link, the buckle comprising a pair of similar plate members connected to the belt, a latch member between the plate members, a pivot connecting the latch member to the plate members for pivotal movement between first and second positions, said plate members each including a hook portion which bounds an open recess, said latch member including a hook portion which extends in a generally opposite direction to the hook portions of the plate members, said hook portion of the latch member bounding a recess which opens in a direction generally opposite to the direction that the recesses in the plate members open, said recess of the latch member being at least in part in registry with the recesses of the plate members in the first position of the latch member while the hook portion of the latch member overlaps the hook portion of the plate members such that a bounded opening a provided in which the link may be accommodated whereby connection is provided between the link and the belt, said latch member including a handle portion which may be manually operated to move the latch member between said first and second positions, said plate members being provided with openings adjacent the handle portion of the latch member to provide access to the handle portion through the openings, said latch member in the second portion thereof having the hook portion thereof out of overlapping relation with the hook portions of the plate members to expose the recesses in the plate members whereby the link and buckle may be disengaged by relative movement therebetween tending to remove the link from the recesses in the plate members, and a finger-shaped element on the latch member facing the hook portion thereof, said finger-shaped element having a straight edge spaced from said hook portion of the latch member for contacting the link as said latch member is pivotally moved from said first position towards said second position to disengage the link and buckle, said straight edge of the hook portion of the latch member being located at a position with respect to the openings of the recesses in the plate members to block said openings when the latch member is in the second position thereof so that entry of the link into the recesses in the plate members is prevented when said latch member is in the second position, said hook portion of the latch member having an outward end portion for engaging said link with the latch member in the first position, said outward end portion of the hook member having a specific curvature such that relative displacement between the link and the latch member in a direction against said end portion produces a force on the hook portion of the latch member which passes through said pivot.

2. A buckle as claimed in claim 1 comprising a spring supported from said plate members and in engagement with said latch member to urge the same towards said first position.

References Cited in the file of this patent

UNITED STATES PATENTS

| | | |
|---|---|---|
| 990,526 | Coble | Apr. 25, 1911 |
| 1,128,719 | Poppenhusen | Feb. 16, 1915 |
| 1,379,788 | Stone | May 31, 1921 |
| 1,667,957 | Stevenson | May 1, 1928 |
| 1,949,608 | Johnson | Mar. 6, 1934 |
| 2,016,041 | Koopetz | Oct. 21, 1935 |
| 2,324,361 | Chandler | July 13, 1943 |
| 2,413,392 | Venerka | Dec. 31, 1946 |
| 2,490,931 | Thompson | Dec. 13, 1949 |
| 2,542,044 | Miller | Feb. 20, 1951 |
| 2,576,867 | Wilson | Nov. 27, 1951 |
| 2,666,664 | Johnson | Jan. 19, 1954 |
| 2,705,586 | Young | Apr. 5, 1955 |
| 2,710,649 | Griswold | June 14, 1955 |
| 2,722,449 | Harley | Nov. 1, 1955 |
| 2,798,277 | Flora | July 9, 1957 |
| 2,804,313 | Gillis | Aug. 27, 1957 |
| 2,864,437 | Spring | Dec. 16, 1958 |
| 2,880,788 | Phillips | Apr. 7, 1959 |
| 2,904,347 | Tucker | Sept. 15, 1959 |
| 2,987,341 | Peck et al. | June 6, 1961 |